US012600880B2

(12) United States Patent (10) Patent No.: US 12,600,880 B2
Nakiri et al. (45) Date of Patent: Apr. 14, 2026

(54) STEERING WHEEL

(71) Applicant: TOYODA GOSEI CO., LTD., Kiyosu (JP)

(72) Inventors: Akira Nakiri, Kiyosu (JP); Moe Oba, Kiyosu (JP); Kazuya Watakabe, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 683 days.

(21) Appl. No.: 18/056,913

(22) Filed: Nov. 18, 2022

(65) Prior Publication Data

US 2023/0167332 A1 Jun. 1, 2023

(30) Foreign Application Priority Data

Nov. 26, 2021 (JP) .................................. 2021-192593

(51) Int. Cl.
    *C09D 175/04* (2006.01)
    *B29C 44/12* (2006.01)
    (Continued)

(52) U.S. Cl.
    CPC ............ *C09D 175/04* (2013.01); *B29C 44/12* (2013.01); *B29C 44/58* (2013.01); *B62D 1/04* (2013.01);
    (Continued)

(58) Field of Classification Search
    None
    See application file for complete search history.

(56) References Cited

U.S. PATENT DOCUMENTS 5,633,289 A * 5/1997 Nakamura ............... C08J 9/142
                                                      528/48
6,455,147 B1 9/2002 Mizuno et al.
                    (Continued)

FOREIGN PATENT DOCUMENTS

JP      2001-096563 A      4/2001
JP      2001-138355 A      5/2001
                    (Continued)

OTHER PUBLICATIONS

Masubuchi, T., Method For Manufacturing Steering Wheel, Jul. 17, 2001, machine translation of JP2001-191355 (Year: 2001).*
                    (Continued)

*Primary Examiner* — Chinessa T. Golden
(74) *Attorney, Agent, or Firm* — Posz Law Group, PLC

(57) ABSTRACT

A steering wheel includes a core and a foamed polyurethane coating that covers a ring section of the core. The foamed polyurethane coating is formed by foam molding of a polyurethane material containing 91 parts by mass of a base polyol, 10 to 25 parts by mass of a pigment, 1 to 3 parts by mass of a benzotriazole ultraviolet absorber, 0.8 to 2.5 parts by mass of a hindered amine photostabilizer, and a polyisocyanate. A total amount of the ultraviolet absorber and the photostabilizer is 2.7 parts by mass or more. The foamed polyurethane coating is in the form of an integral skin foam including a highly foamed core foam and a lowly foamed skin layer. The surface of the skin layer is not provided with a coating film formed from a coating material, and serves as a product surface that assumes a color of the pigment.

1 Claim, 3 Drawing Sheets

(51) Int. Cl.

| | | |
|---|---|---|
| *B29C 44/58* | (2006.01) | |
| *B62D 1/04* | (2006.01) | |
| *B29K 75/00* | (2006.01) | |
| *B29K 105/00* | (2006.01) | |
| *B29K 105/04* | (2006.01) | |

(52) U.S. Cl.

CPC .. *B29K 2075/00* (2013.01); *B29K 2105/0032* (2013.01); *B29K 2105/0038* (2013.01); *B29K 2105/0044* (2013.01); *B29K 2105/043* (2013.01)

(56) References Cited

U.S. PATENT DOCUMENTS

| | | |
|---|---|---|
| 2011/0077346 A1 | 3/2011 | Humphrey et al. |
| 2011/0105673 A1 | 5/2011 | Humphrey et al. |
| 2011/0177344 A1 | 7/2011 | Humphrey et al. |
| 2017/0247540 A1 | 8/2017 | Humphrey et al. |

FOREIGN PATENT DOCUMENTS

| | | | | |
|---|---|---|---|---|
| JP | 2001-191355 A | | 7/2001 | |
| JP | 2001-199347 A | | 7/2001 | |
| JP | 2001191335 A | * | 7/2001 | |
| JP | 2010-535934 A | | 11/2010 | |
| WO | WO-2009023131 A2 | * | 2/2009 | .............. C08L 75/04 |

OTHER PUBLICATIONS

Office Action dated Apr. 16, 2024 in corresponding Japanese Patent Application No. 2021-192593 (and English machine translation).

* cited by examiner

F I G.  1 A
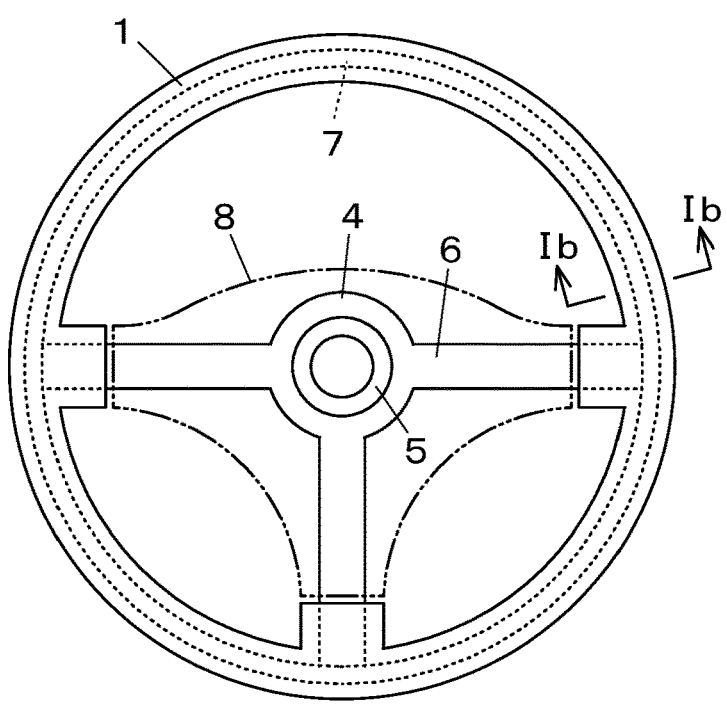
F I G.  1 B
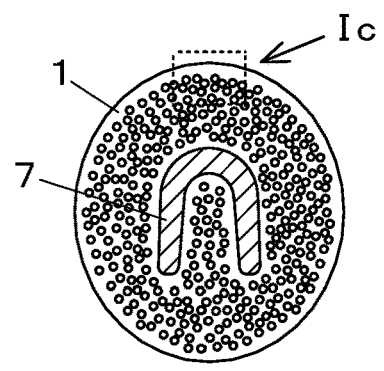
F I G.  1 C
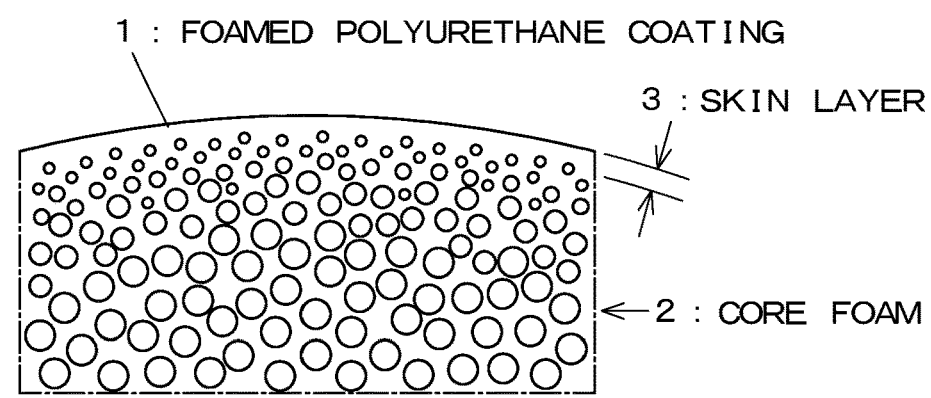
1 : FOAMED POLYURETHANE COATING
3 : SKIN LAYER
2 : CORE FOAM F I G.  2
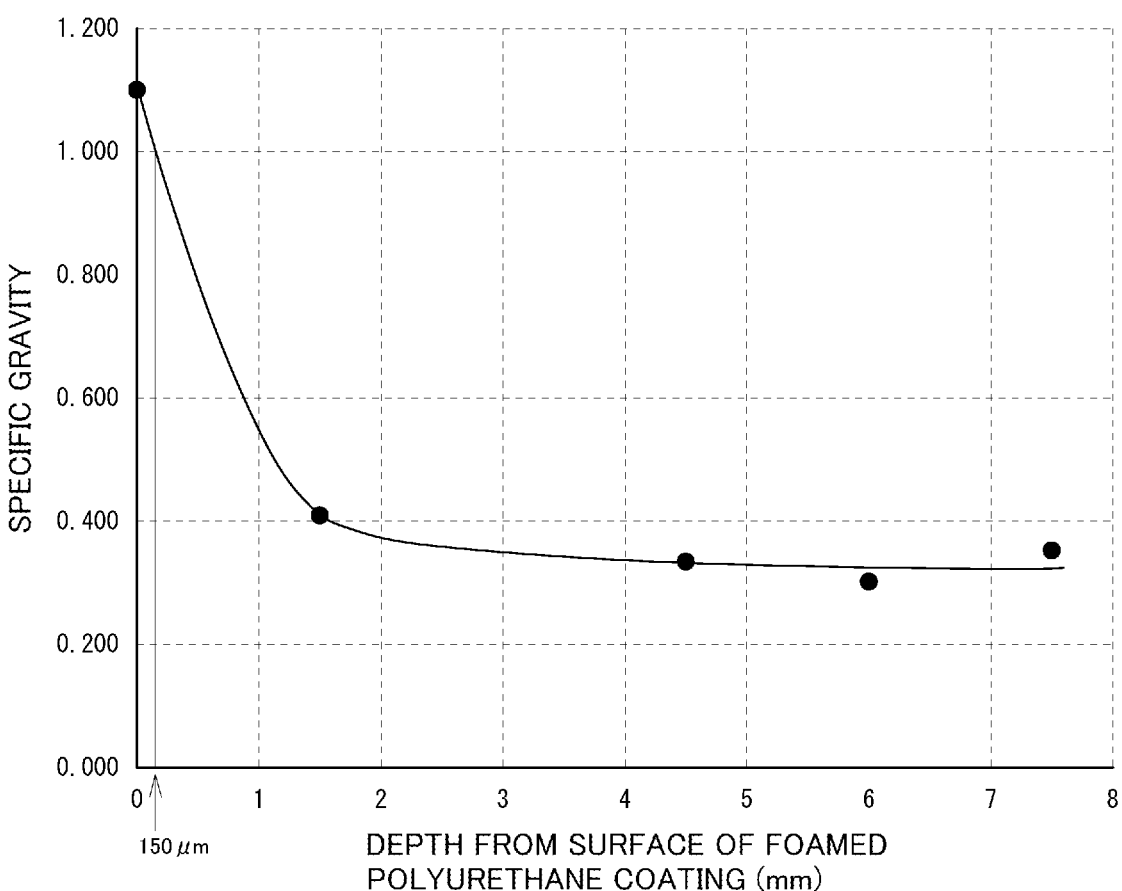

F I G.   3 A
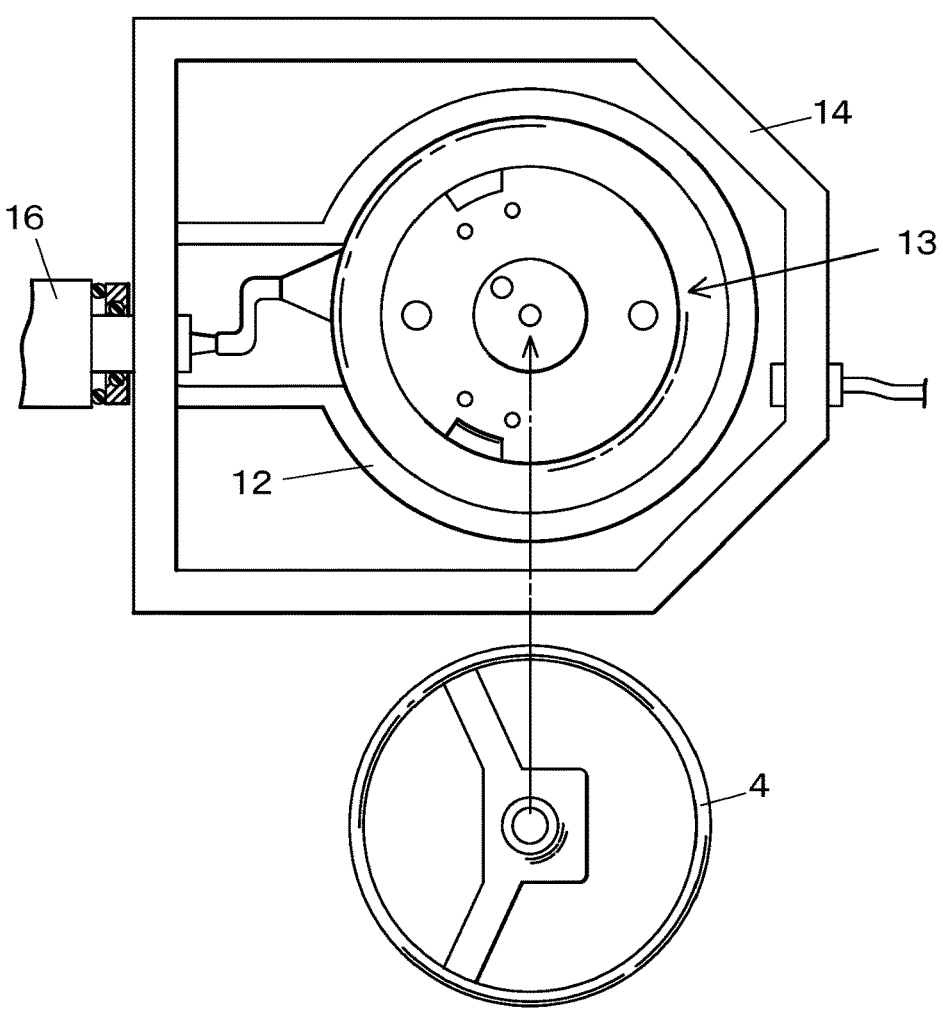
F I G.   3 B
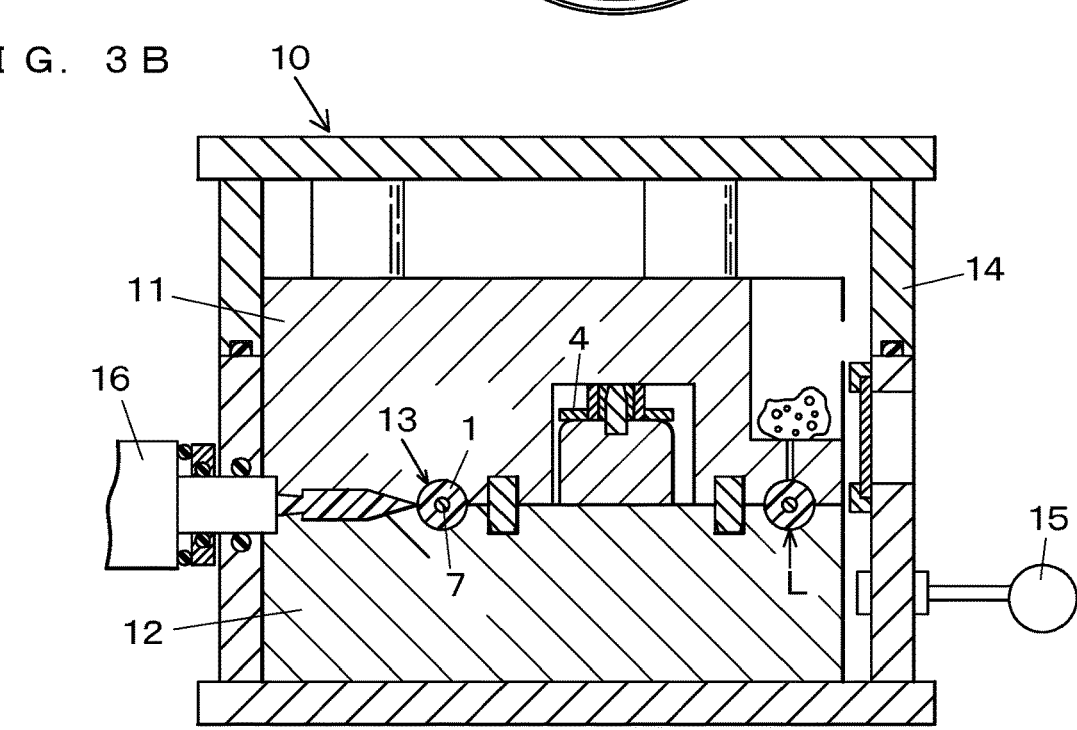

STEERING WHEEL

TECHNICAL FIELD

The present invention relates to a steering wheel including a foamed polyurethane coating that covers a ring section of a core.

BACKGROUND ART

Many automobile steering wheels are provided with a polymer coating that covers a ring section of a core. Various types of polymer coatings have been provided, and polymer coatings that have recently become mainstream are foamed polyurethane coatings produced by reaction injection molding (RIM) of a polyol component and a polyisocyanate component. A polyurethane coating prepared by urethane crosslinking inherently has superior properties such as high durability and wear resistance.

However, a polyurethane coating has low light resistance. Thus, particularly when a polyurethane coating is used in a steering wheel, which is exposed to sunlight, the polyurethane coating is likely undergoes discoloration due to ultraviolet degradation. Meanwhile, the surface of a foamed polyurethane coating has pores due to foaming, resulting in a poor appearance. Therefore, it is necessary to form a coating film from a coating material on the surface of the foamed polyurethane coating in order to prevent discoloration of the polyurethane coating by ultraviolet blocking and to conceal the pores. Such a coating film is formed by the in-mold coating method wherein the aforementioned RIM process is performed on a die having a cavity surface previously coated with a coating material, and the coating material is transferred to the surface of a polyurethane coating (Patent Documents 1 and 2).

The in-mold coating method reduces the labor, time, and cost required for the coating after molding. However, the process of uniformly applying a coating material onto the cavity surface before molding requires labor, time, and cost. In addition, coating burrs may occur on the mating surfaces of the die, and the finishing process for removing the burrs is laborious, time-consuming, and costly.

Patent Document 3 discloses a method for producing a steering wheel having a soft texture comparable to RIM foamed urethane, wherein a foamable thermoplastic elastomer containing a thermoplastic elastomer and a foaming agent is injected into a die cavity and foamed, to thereby produce the steering wheel. This patent document describes that it is desirable to add an ultraviolet absorber (e.g., a benzotriazole compound or a benzophenone compound) or a photostabilizer (hindered amine compound) to the elastomer. However, the patent document describes neither the amount of such a compound added to the elastomer, nor examples wherein such a compound is added to the elastomer.

CITATION LIST

Patent Documents

[Patent Document 1] Japanese Unexamined Patent Application Publication No. 2001-96563 (JP 2001-96563 A)
[Patent Document 2] Japanese Unexamined Patent Application Publication No. 2001-138355 (JP 2001-138355 A)
[Patent Document 3] Japanese Unexamined Patent Application Publication No. 2001-191355 (JP 2001-191355 A)

SUMMARY OF THE INVENTION

Technical Problem

In view of the foregoing, an object of the present invention is to efficiently improve the light resistance of a foamed polyurethane coating itself of a steering wheel, eliminate the need for a coating film formed from a coating material, and thus reduce the labor, time, and cost required for forming a coating film.

Solution to Problem

The present invention provides a steering wheel including a core, and a foamed polyurethane coating that covers a ring section of the core, wherein:

the foamed polyurethane coating is formed by foam molding of a polyurethane material containing 91 parts by mass of a base polyol, 10 to 25 parts by mass of a pigment, 1 to 3 parts by mass of a benzotriazole ultraviolet absorber, 0.8 to 2.5 parts by mass of a hindered amine photostabilizer, and a polyisocyanate, wherein a total amount of the ultraviolet absorber and the photostabilizer is 2.7 parts by mass or more;

the foamed polyurethane coating is in the form of an integral skin foam including a highly foamed core foam and a lowly foamed skin layer;

the skin layer has a non-foamed surface and a thickness of 50 μm or more, wherein a degree of foaming increases with an increase in depth from the surface, and the skin layer ranges from the surface to a depth at which a specific gravity is 90% of that at the surface; and the surface of the skin layer is not provided with a coating film formed from a coating material, and serves as a product surface that assumes a color of the pigment.

The lower limit of the amount of the benzotriazole ultraviolet absorber is preferably 1.5 parts by mass, and the upper limit of the amount thereof is preferably 2.5 parts by mass.

The lower limit of the amount of the photostabilizer is preferably 1 part by mass, and the upper limit of the amount thereof is preferably 2 parts by mass.

The thickness of the skin layer is preferably 100 μm or more, more preferably 140 μm or more. The upper limit of the thickness is 1,000 μm, although there is no particular upper limit in terms of performance.

[Effects]

Since a foamed polyurethane coating has a low density due to foaming, even if an ultraviolet absorber and a photostabilizer are incorporated into the polyurethane material, they are dispersed at a low density in the material, leading to difficulty in improving the light resistance of the polyurethane coating. Therefore, at the beginning of the development of the foamed polyurethane coating, it was considered that each of the ultraviolet absorber and the photostabilizer should be incorporated in a large amount (e.g., about 6 to 10 parts by mass) to 100 parts by mass of a base polyol.

In the present invention, the foamed polyurethane coating is in the form of an integral skin foam including a highly foamed core foam and a lowly foamed skin layer. The skin layer has a non-foamed surface and a thickness of 50 μm or more, wherein the degree of foaming increases (i.e., the specific gravity decreases) with an increase in depth from the surface, and the skin layer ranges from the surface to a depth at which the specific gravity is 90% of that at the surface. Thus, the skin layer has a high density. Therefore, the benzotriazole ultraviolet absorber and the photostabilizer are present at a high density in the high-density skin layer, even when the amounts of the ultraviolet absorber and the photostabilizer are small; i.e., the amount of the ultraviolet absorber is 1 to 3 parts by mass and the amount of the photostabilizer is 0.8 to 2.5 parts by mass relative to 91 parts by mass of the base polyol, and the total amount of the ultraviolet absorber and the photostabilizer is 2.7 parts by mass or more.

The ultraviolet absorber contained in the skin layer absorbs and blocks ultraviolet rays, to thereby protect the skin layer and the core foam disposed below the skin layer. The photostabilizer contained in the skin layer alters with ultraviolet rays, and scavenges generated radicals, to thereby repair damages. Furthermore, some ultraviolet rays that pass through the skin layer and reach the core foam are absorbed by the ultraviolet absorber contained in the core foam, and the photostabilizer contained in the core foam repairs damages.

In addition, the amount of the pigment is 10 to 25 parts by mass relative to 91 parts by mass of the base polyol, and the surface of the skin layer serves as a product surface that assumes a color of the pigment. Thus, the pigment contained in the skin layer partially shields ultraviolet rays. Since the skin layer has a non-foamed surface, the skin layer does not require a coating film that conceals pores due to foaming as described above.

Because of the above-described effects, the light resistance of the foamed polyurethane coating itself can be efficiently improved by using small amounts of the ultraviolet absorber and the photostabilizer and an appropriate amount of the pigment, pores due to foaming are not required to be concealed, and a coating film formed from a coating material can be omitted. In addition, the foamed polyurethane coating exhibits excellent wear resistance, since it includes the high-density skin layer.

Advantageous Effects of Invention

According to the steering wheel of the present invention, the light resistance of the foamed polyurethane coating itself can be efficiently improved, a coating film formed from a coating material can be omitted, and thus the labor, time, and cost required for forming a coating film can be reduced.

BRIEF DESCRIPTION OF DRAWINGS

FIGS. 1A to 1C show a steering wheel of each Example, where
FIG. 1A is a front view, FIG. 1B is a Ib-Ib cross-sectional view, and FIG. 1C is an enlarged view of an arrow-indicating portion Ic of a foamed polyurethane coating;
FIG. 2 is a graph showing the relationship between the depth from the surface of the foamed polyurethane coating of the Example and the specific gravity thereof; and
FIGS. 3A and 3B show an apparatus and method for molding the foamed polyurethane coating, where FIG. 3A is a plan view of a lower die, and FIG. 3B is a cross-sectional view of the lower die.

DESCRIPTION OF EMBODIMENTS

[1] Base Polyol
Examples of the base polyol used in the polyurethane material include, but are not particularly limited to, polyether polyols (e.g., polypropylene glycol (PPG), polyethylene glycol (PEG), and polyoxytetramethylene glycol (PTMG)), polyester polyols, and polymer polyols. These polyols may be used in combination of plural species.
[2] Polyisocyanate
Examples of the polyisocyanate used in the polyurethane material include, but are not particularly limited to, known aliphatic, alicyclic, and aromatic organic isocyanate compounds having two or more isocyanate groups. These compounds may be used in combination of plural species. Specific examples of the polyisocyanate include hexamethylene diisocyanate, isophorone diisocyanate, 4,4-dicyclohexylmethane diisocyanate, 2,4- or 2,6-tolylene diisocyanate (toluene diisocyanate or toluidine diisocyanate: TDI), alkylene diisocyanate or arylene isocyanate such as 2,2'- or 2,4- or 4,4'-diphenylmethane diisocyanate (MDI), and known triisocyanates and polymeric MDI.
[3] Pigment
Examples of the pigment include, but are not particularly limited to, carbon black and ceramic materials.
No particular limitation is imposed on the diameter (aggregation diameter) of the pigment contained in the foamed polyurethane coating, but the diameter is preferably 250 nm or less, more preferably 150 nm or less.
[4] Benzotriazole Ultraviolet Absorber
Examples of the benzotriazole ultraviolet absorber include, but are not particularly limited to, 2-(2-hydroxy-5-methylphenyl)benzotriazole, 2-(2-hydroxy-4,6-di-tert-phenyl)benzotriazole, 2-(3-tert-butyl-2-hydroxy-5-methylphenyl)-5-chlorobenzotriazole, and a three-component mixture ((α-[3-[3-(2H-benzotriazol-2-yl)-5-(1,1-dimethylethyl)-4-hydroxyphenyl]-1-oxopropyl]-ω-hydroxypoly(oxo-1,2-ethanediyl), α-[3-[3-(2H-benzotriazol-2-yl)-5-(1,1-dimethylethyl)-4-hydroxyphenyl]-1-oxopropyl]-ω-[3-[3-(2H-benzotriazol-2-yl)-5-(1,1-dimethylethyl)-4-hydroxyphenyl]-1-oxopropoxy]poly(oxy-1,2-ethanediyl), $H(OCH_2CH_2)_6$-7OH).
[5] Hindered Amine Photostabilizer
Examples of the hindered amine photostabilizer include, but are not particularly limited to, bis(1,2,2,6,6-pentamethyl-4-piperidinyl)-[[3,5-bis(1,1-dimethylethyl)-4-hydroxyphenyl]methyl], and a two-component mixture (bis(1,2,2,6,6-pentamethyl-4-piperidinyl) sebacate, methyl(1,2,2,6,6-pentamethyl-4-piperidinyl) sebacate).
[6] Additional Compounding Agent
The polyurethane material may contain, besides the aforementioned components, a catalyst, a foam stabilizer, an antioxidant, a foaming agent, etc. If necessary, the polyurethane material may further contain, for example, a filler or a flame retardant.
[7] Foaming
Examples of the type of foaming of the foamed polyurethane coating include, but are not particularly limited to, foaming under reduced pressure (bumping of occluded gas passively contained in the polyurethane material under reduced pressure), foaming with a foaming agent, and foaming by combination of these.
Examples of the foaming agent include, but are not particularly limited to, water (generation of $CO_2$ through promotion of the reaction between water and the isocyanate).

Examples

Next will be described Examples of the present invention together with Comparative Examples. The structure, material, shape, and size of each section in the Examples are merely an example, and they may be appropriately modified without departing from the spirit of the invention.

As shown in FIGS. 1A to 1C, the steering wheel of each of the Examples and Comparative Examples includes a core 4 having a boss section 5, a spoke section 6, and a ring section 7; a foamed polyurethane coating 1 that covers the ring section 7 and a portion of the spoke section 6; and a pad 8 disposed on the boss section 5 and the spoke section 6.

The foamed polyurethane coating 1 is in the form of an integral skin foam including a highly foamed core foam 2 and a lowly foamed skin layer 3. The terms "highly foamed" and "lowly foamed" as used herein refer to relative concepts. The skin layer 3 has a non-foamed surface, and the degree of foaming increases with an increase in depth from the surface. The skin layer 3 ranges from the surface to a depth at which the specific gravity is 90% of that at the surface. The surface of the skin layer 3 is not provided with a coating film formed from a coating material, and serves as a product surface that assumes a color of the aforementioned pigment.

The polyurethane coating 1 is formed by RIM molding using the material, molding apparatus, and method described below.

The polyurethane materials (main agent and curing agent) of Examples 1 to 4 and Comparative Examples 1 to 5 for RIM molding of polyurethane coatings were prepared to achieve formulations shown in Table 1 below.

TABLE 1

| | | | | | | Comparative Example 1 | Comparative Example 2 | Comparative Example 3 | Comparative Example 4 | Comparative Example 5 |
|---|---|---|---|---|---|---|---|---|---|---|
| Formulation | Main Agent | Base Polyol | PPG | | part by mass | 91 | ← | ← | ← | ← |
| | | Crosslinking Agent | Low-molecular-weight Diol | | part by mass | 15.5 | ← | ← | ← | ← |
| | | Catalyst | Amine | | part by mass | 6.8 | ← | ← | ← | ← |
| | | Foam Atabilizer | Silicone | | part by mass | 0.7 | ← | ← | ← | ← |
| | | Ultraviolet Absorber | Tinuvin213 | | part by mass | 0 | 1 | 2 | 1 | 1.5 |
| | | Photostabilizer | Tinuvin765 | | part by mass | 0.4 | 0.5 | 0.5 | 1.5 | 1 |
| | | Antioxidant | Irganox1135 | | part by mass | 0.2 | 0.2 | 0.2 | 0.2 | 0.2 |
| | | Pigment | Carbon Black | | part by mass | 15 | ← | ← | ← | ← |
| | | Foaming Agent | Water | | part by mass | 0.15 | ← | ← | ← | ← |
| | Curing Agent | Polyisocyanate | MDI | | part by mass | 89.6 | ← | ← | ← | ← |
| Property | | Tensile Strength | Initial | MPa | | 2 | 2 | 2 | 2 | 2 |
| | | | After 400-hour Light Resistance Test | MPa | | 1 | 1.2 | 1.2 | 1.2 | 1.1 |
| | | | Percent Retention | % | | 51 | 62 | 60 | 62 | 59 |
| | | | | Evaluation | | Δ | ○ | ○ | ○ | ○ |
| | | Appearance | | Grade | | 3 | 3 | 3 | 3 | 3 |
| | | | | Evaluation | | X | X | X | X | X |

| | | | | | | Example 1 | Example 2 | Example 3 | Example 4 |
|---|---|---|---|---|---|---|---|---|---|
| Formulation | Main Agent | Base Polyol | PPG | | part by mass | 91 | ← | ← | ← |
| | | Crosslinking Agent | Low-molecular-weight Diol | | part by mass | 15.5 | ← | ← | ← |
| | | Catalyst | Amine | | part by mass | 6.8 | ← | ← | ← |
| | | Foam Atabilizer | Silicone | | part by mass | 0.7 | ← | ← | ← |
| | | Ultraviolet Absorber | Tinuvin213 | | part by mass | 1.6 | 2 | 1.5 | 2 |
| | | Photostabilizer | Tinuvin765 | | part by mass | 1.2 | 1 | 1.5 | 1.5 |
| | | Antioxidant | Irganox1135 | | part by mass | 0.2 | 0.2 | 0.2 | 0.2 |
| | | Pigment | Carbon Black | | part by mass | 15 | ← | ← | ← |
| | | Foaming Agent | Water | | part by mass | 0.15 | ← | ← | ← |
| | Curing Agent | Polyisocyanate | MDI | | part by mass | 89.6 | ← | ← | ← |
| Property | | Tensile Strength | Initial | MPa | | 1.8 | 2 | 2 | 2 |
| | | | After 400-hour Light Resistance Test | MPa | | 1.5 | 1.1 | 1.1 | 1.3 |
| | | | Percent Retention | % | | 63 | 55 | 58 | 65 |
| | | | | Evaluation | | ○ | ○ | ○ | ○ |
| | | Appearance | | Grade | | 4 | 4 | 4 | 4 |
| | | | | Evaluation | | ○ | ○ | ○ | ○ |

[Main Agent (Polyol Component)]

The base polyol is PPG having an average molecular weight of 5,000.

The crosslinking agent is a low-molecular-weight diol and is used for adjustment of hardness.

The catalyst is an amine catalyst and is used for enhancing reactivity.

The foam stabilizer is a silicone foam stabilizer and is used for controlling bubble formation.

The ultraviolet absorber is a benzotriazole ultraviolet absorber. Trade name "Tinuvin 213" available from BASF Japan Ltd. was used.

The photostabilizer is a hindered amine photostabilizer. Trade name "Tinuvin 765" available from BASF Japan Ltd. was used.

The antioxidant used was trade name "Irganox 1135" available from BASF Japan Ltd.

The pigment contains carbon black as a main component. Trade name "NRC-F7DT3" available from Nippon Pigment Company Limited was used.

The foaming agent is water.

[Curing Agent (Polyisocyanate Component)]

The polyisocyanate is diphenylmethane diisocyanate (MDI).

The molding apparatus used is described in Japanese Unexamined Patent Application Publication No. 2001-96544 (JP 2001-96544 A) by the present applicant. Briefly, as shown in FIGS. 3A and 3B, the molding apparatus includes a molding die 10 composed of two separate dies; a vacuum box 14 wherein the molding die 10 can be disposed; a vacuum pump 15 for vacuum suction in the vacuum box 14; and a material ejector 16 for ejecting a polyurethane material. The molding die 10 includes an upper die 11 and a lower die 12, and the facing surfaces of these dies have concave portions to form a ring-shaped cavity 13 during attachment of the dies.

The core 4 was placed in the molding die 10, and the main agent and the curing agent were mixed by the material ejector 16 and injected into the cavity 13 wherein the ring section 7 was set. The polyurethane material was injected from the gate on the left side into the cavity 13 so as to flow in two different directions, and the cavity 13 was filled with foamed material. Subsequently, the different material flows were converged at the final filling position L on the right side, and the material was slightly ejected from the vent. The injected polyurethane material became a highly foamed core foam at a position away from the molding surface, and became a lowly foamed skin layer at a position in contact with the molding surface, to thereby form a polyurethane coating. After the polyurethane material was cured, the resultant steering wheel was removed from the die.

Each of the polyurethane coatings of Examples 1 to 4 and Comparative Examples 1 to 5 was subjected to measurement of the properties described below.

[1] Thickness of Skin Layer

Test pieces were cut out from the polyurethane coating at the surface and at depths of 1.5 mm, 4.5 mm, 6 mm, and 7.5 mm from the surface. The specific gravity of each of the test pieces was measured according to JIS 28807. The results of measurement in Example 1 are shown in the graph of FIG. 2. The approximation described in the graph was assumed to be effective, and the thickness was calculated from the same approximation. As described above, the skin layer ranges from the surface to a depth at which the specific gravity is 90% (1.0) of the specific gravity at the surface (1.1). Thus, the thickness of the skin layer was 150 μm. Similarly, the thickness of the skin layer was 150 μm in Examples 2 to 4 and Comparative Examples 1 to 5.

[2] Tensile Strength

According to JIS K6251, a dumbbell No. 1 test piece (including the surface skin layer) was cut out from each of the aforementioned initial polyurethane coating after molding and the polyurethane coating after the following light resistance test, and the tensile strength of the test piece was measured.

The light resistance test was performed on a 10 cm length sample cut out from the polyurethane coating with a tester "UV Fade Meter U48B" available from Suga Test Instruments Co., Ltd. through irradiation of ultraviolet rays at an irradiation intensity of 500 W/m$^2$ for 400 hours (back panel temperature of the tester: 83° C.). These test conditions assume the use in the market for three years. A dumbbell No. 1 test piece was cut out from the tested sample.

The thus-measured tensile strength is shown in Table 1 above. The tensile strength was evaluated as good (○) when the percent retention of tensile strength before and after the light resistance test was 53% or more, or evaluated as fail (A) when the percent retention was less than 53% (preferably 55% or more).

[3] Appearance

The appearance of the polyurethane coating was observed after the aforementioned light resistance test. According to the following criteria, the appearance was evaluated as good (○) in the case of Grade 4 or higher, or evaluated as fail (×) in the case of Grade 3 or lower. The results are shown in Table 1 above.

Grade 1: Abnormality is quite severe.

Grade 2: Abnormality is severe.

Grade 3: Abnormality is subtle, but clearly visible.

Grade 4: Abnormality is slightly observed, but hardly noticeable.

Grade 5: No abnormality is observed.

The present invention is not limited to the aforementioned Examples, and may be appropriately modified and embodied without departing from the spirit of the invention.

REFERENCE SIGNS LIST

1 Foamed polyurethane coating
2 Core foam
3 Skin layer
4 Core
7 Ring section

The invention claimed is:

1. A steering wheel comprising a core, and a foamed polyurethane coating that covers a ring section of the core, wherein:

the foamed polyurethane coating is formed by reaction injection foam molding of a polyurethane material containing 91 parts by mass of a base polyol, 10 to 25 parts by mass of a pigment, 1 to 3 parts by mass of a benzotriazole ultraviolet absorber, 0.8 to 2.5 parts by mass of a hindered amine photostabilizer, and a polyisocyanate, wherein a total amount of the ultraviolet absorber and the photostabilizer is 2.7 parts by mass or more;

the foamed polyurethane coating is in the form of an integral skin foam including a core foam and a skin layer;

the core foam is relatively highly foamed compared to the skin layer, and the skin layer is relatively lowly foamed compared to the core foam;

the skin layer has a non-foamed surface and a thickness of 50 μm or more, wherein a degree of foaming increases with an increase in depth from the surface, and the skin layer ranges from the surface to a depth at which a specific gravity is 90% of that at the surface; and the surface of the skin layer is not provided with a coating film formed from a coating material, and serves as a product surface that assumes a color of the pigment.

\* \* \* \* \*